(No Model.)

J. A. HANAGIN.
TERMINAL FOR ELECTRIC CABLES.

No. 428,046. Patented May 13, 1890.

Witnesses:
Chas. G. Hawley.
Geo. R. Parker.

Inventor:
Joseph Augustus Hanagin
By George A. Barton
Attorney.

UNITED STATES PATENT OFFICE.

JOSEPH AUGUSTUS HANAGIN, OF CHICAGO, ILLINOIS, ASSIGNOR TO THE WESTERN ELECTRIC COMPANY, OF SAME PLACE.

TERMINAL FOR ELECTRIC CABLES.

SPECIFICATION forming part of Letters Patent No. 428,046, dated May 13, 1890.

Application filed March 25, 1889. Serial No. 304,611. (No model.)

*To all whom it may concern:*

Be it known that I, JOSEPH AUGUSTUS HANAGIN, a citizen of the United States, residing at Chicago, in the county of Cook and State of Illinois, have invented a certain new and useful Improvement in Terminals for Electric Cables, (Case 1,) of which the following is a full, clear, concise, and exact description, reference being had to the accompanying drawings, forming a part of this specification.

My invention relates to terminals for electric cables; and its object is to provide for connecting cables together, as at the man-holes of underground conduits, in such manner that the cable will be protected from moisture and readily accessible for testing or repairs.

My invention is designed more especially for single-conductor cables—as, for example, those used in arc lighting and designed to carry currents of high tension.

My invention consists in placing a metallic cap over each of the ends of the sections of the cable to be united, soldering the conductor to these caps, and then locking the caps together, as hereinafter described.

My invention further consists in the protecting sleeve or coupling, which is placed over the joint thus formed in the conductor.

My invention may be used in connection with lead-pipe-covered cables or for connecting a lead-pipe-covered cable with a kerite, gutta-percha, or other cable.

As to the state of the art prior to my invention, reference is made to Letters Patent No. 251,729, granted William R. Patterson January 3, 1882, for telegraph-cable terminal, and No. 309,246, granted William R. Patterson December 16, 1884, for electric-light conductor.

My invention is illustrated in the accompanying drawings, in which—

Figure 1:
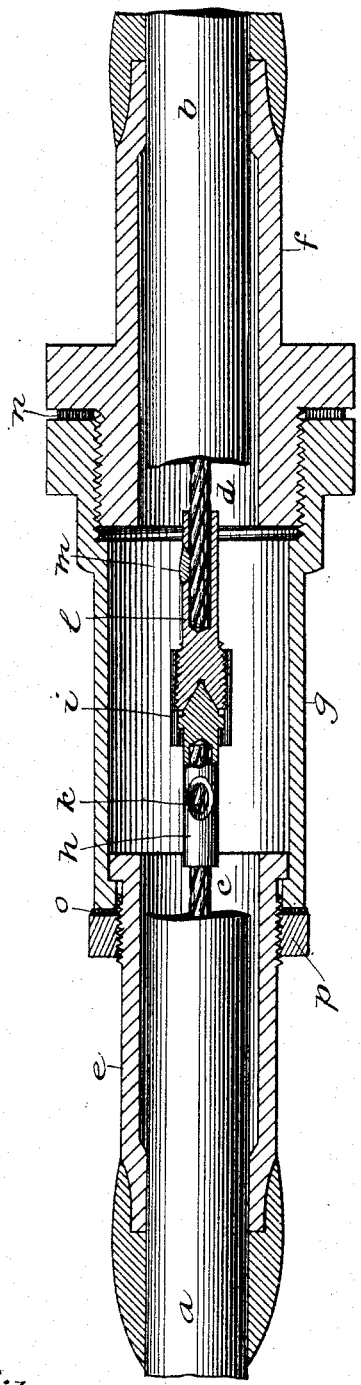
Figure 2:
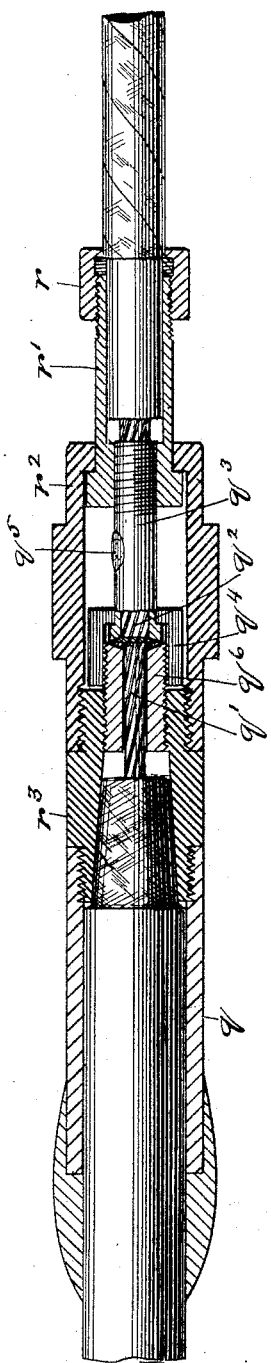

Figure 1 is a longitudinal sectional view showing two lead-covered cables connected together in accordance with my invention. Fig. 2 is a longitudinal sectional view in which my invention is applied in connecting a lead-pipe-covered cable with a kerite cable.

As shown in Fig. 1, $a$ is the lead pipe of one section of cable, and $b$ is the end of a corresponding section. The ends of these sections are to be united, so that the conductor will be thoroughly insulated and protected and at the same time readily accessible when desired. The lead and insulating filling at the ends of the sections $a$ $b$ should be removed, so that the ends $c$ $d$ of the conductor will be bared. The sleeve $e$ is then secured to the lead pipe of section $a$ by a wipe-joint, as shown, and the sleeve $f$ is secured in a similar manner to the lead pipe of the section $b$. The coupling $g$ is then slipped back over the sleeve $e$. The cap $h$, on which is provided the lock-nut $i$, is then placed over the end $c$ of the conductor and is soldered thereto through an opening $k$. The cap $l$ is placed over the corresponding bare end $d$ of the conductor of section $b$, as shown, and soldered thereto, as shown at $m$. The cap $l$ is provided with a screw corresponding to the thread of the nut $i$. The nut is turned onto this screw provided upon cap $l$, as shown, so as to unite the two ends $c$ $d$ together mechanically and electrically. The coupling $g$ is now brought into place and turned onto the screw provided on sleeve $f$. In order that the joints of the coupling $g$ may be tight, I preferably provide packing $n$ $o$ at the ends thereof. The coupling is forced against the packing $n$ when it is turned onto the screw upon the sleeve $f$, while a nut $p$, screwed over the sleeve $e$, presses the lead $o$ or other packing against the other end of coupling $g$. In order to get at the conductor, it is only necessary to unscrew the nut $p$ and the coupling $g$, slipping them over the end of section $a$. If it is desired to disconnect the ends $c$ $d$ of the conductor, the lock-nut $i$ is simply turned off from the screw on cap $l$.

Referring now to Fig. 2, it will be seen that my invention may be used to connect a lead-pipe-covered cable with a kerite, gutta-percha, or other insulated conductor. The metal sleeve $q$ is secured to the lead pipe by a wipe-joint, as before described. The corresponding ends $q'$ and $q^2$ are bared. The cap $q^3$, provided with the lock-nut $q^4$, is placed over the end $q^2$ and soldered thereto, as shown at $q^5$. The cap $q^6$ is placed over the end $q'$ of the conductor and soldered thereto. The rubber nut $r$, the rubber sleeve $r'$, the rubber coupling $r^2$, and the rubber sleeve $r^3$, having been previously slipped over the kerite conductor, are brought into place after ends $q'$ and $q^2$ have been secured together mechanically and electrically by the lock-nut $q^4$, and thus the joint is thoroughly protected and made accessible for tests and repairs when desired.

Having thus described my invention, I claim as new and desire to secure by Letters Patent—

1. The combination, with the ends of two sections of an electric-cable conductor, of metal caps attached thereto, one of said caps provided with a thread and the other with a shoulder and nut, the nut adapted to be turned upon the screw to bring the two ends of the caps together, and a removable protecting-covering, substantially as and for the purpose specified.

2. The ends of the lead pipe of two corresponding sections of telegraph-cable provided each with a sleeve soldered thereto, a removable coupling secured by water-proof joints to said sleeves to unite the same together, in combination with the bared corresponding ends of the conductor of said sections of cable inclosed in said coupling and united together by caps $h\ l$, soldered thereto, respectively, said caps being held together in electrical contact by the lock-nut $i$, substantially as and for the purpose specified.

3. The combination, with the bared corresponding ends of the conductors of two corresponding sections of telegraph-cable, of metal caps, one upon each of said ends, one cap being provided with a shoulder and the other with a screw, in combination with a lock-nut provided with a thread corresponding to the screw and with a bearing adapted to be brought against the shoulder, whereby on turning the lock-nut onto the screw the two caps are forced together into electrical contact, substantially as and for the purpose specified.

In witness whereof I hereunto subscribe my name this 4th day of January, A. D. 1889.

JOSEPH AUGUSTUS HANAGIN.

Witnesses:
ELLA EDLER,
GEORGE P. BARTON.